May 13, 1930.  J. FENTRESS  1,758,077
LIQUID TANK LEVEL GAUGE
Filed July 25, 1925   2 Sheets-Sheet 1
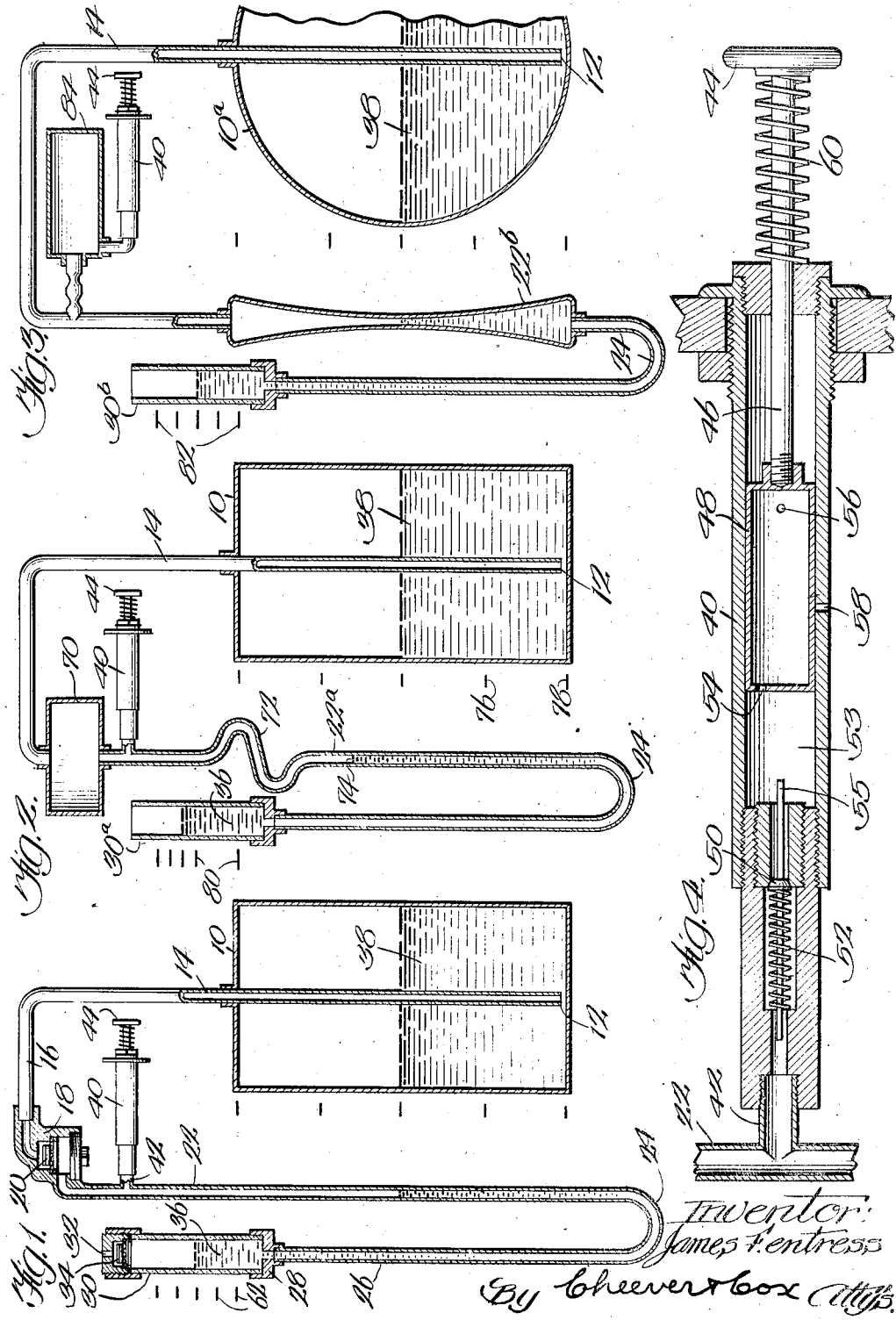
Inventor:
James Fentress
By Cheever & Cox Attys.

May 13, 1930.  J. FENTRESS  1,758,077
LIQUID TANK LEVEL GAUGE
Filed July 25, 1925   2 Sheets-Sheet 2
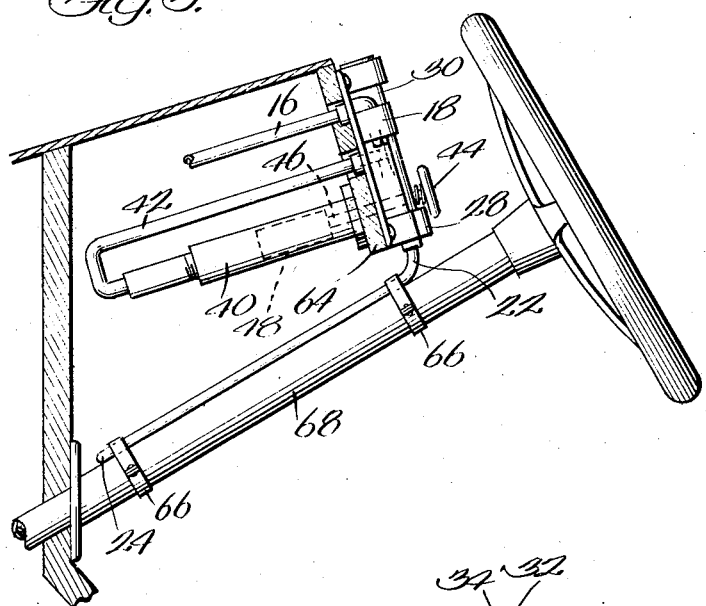
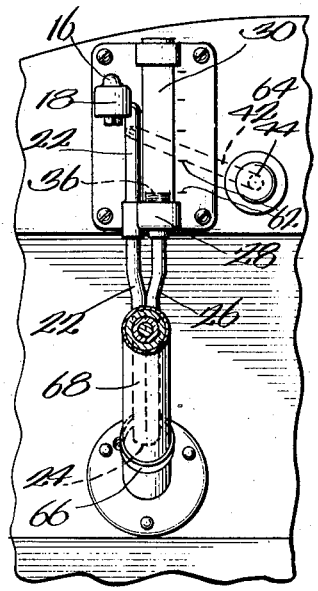
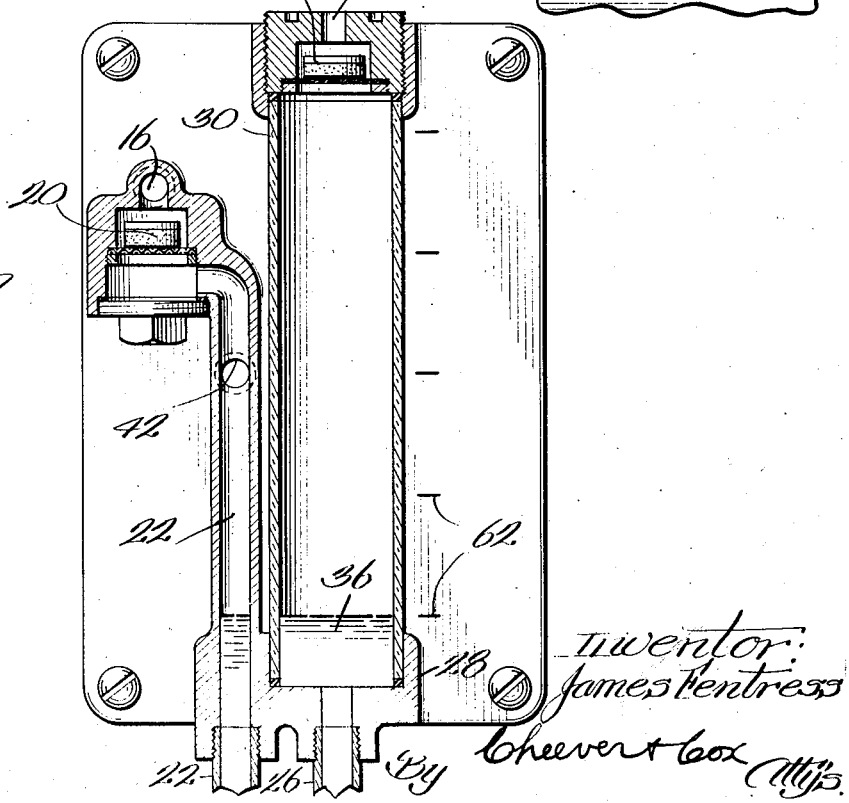

Patented May 13, 1930

1,758,077

UNITED STATES PATENT OFFICE

JAMES FENTRESS, OF CHICAGO, ILLINOIS

LIQUID-TANK-LEVEL GAUGE

Application filed July 25, 1925. Serial No. 46,014.

This invention relates to devices operating on the hydrostatic principle to indicate a level of liquid in a tank, and is especially applicable to the use of determining the amount of gasoline and other liquids in tanks or other containers on an automobile traveling over more or less irregular surfaced roads.

The object of the invention is to provide a device of this kind in which changes in depth of gasoline or other liquid in a tank are much more accurately indicated on the suitably located gauge, usually on the dash of the automobile, than has heretofore been possible in devices of this class.

The invention consists in means for attaining the foregoing and other objects; which can be easily and cheaply made; which is satisfactory in use and is not readily liable to get out of order.

More particularly, the invention consists in numerous features and details of construction hereafter more fully set forth in the specification and claims.

Referring to the drawings in which like numerals represent the same parts throughout the several views:

Figure 1 is a vertical, sectional, detailed view through a preferred form of mechanism, illustrating the application of this invention to the gasoline tank of an automobile.

Figure 2 is a similar view, showing a modified construction of the device of Figure 1 in which the condition of a particular quantity of gasoline in the tank, specifically the bottom gallon in the tank, is magnified and especially clearly shown in the indicator or gauge, visible to the operator of the automobile.

Figure 3 is a modified form of the structures of Figures 1 and 2, showing means for accurately registering at the gauge on a scale of uniform divisions, the quantity of gasoline in a tank of non-rectangular cross-section.

Figure 4 is a detailed, sectional view through a pump, especially designed for use in connection with the mechanism of this invention.

Figure 5 is a side view of an automobile dash and steering post, showing the application of the mechanism of this invention thereto.

Figure 6 is a face view from the right of Figure 5, the steering wheel being removed.

Figure 7 is a vertical, sectional, detailed view through the gauge mechanism appearing in Figure 6.

Figure 1 of the drawings shows a liquid, specifically a gasoline, tank 10, of rectangular form, having entering it and extending to a point 12 near its bottom, a comparatively small delivery pipe 14. The upper end of this pipe 14 has above the tank a laterally extending end 16, entering a valve enclosing coupling 18. Entering the other side of this coupling 18, beyond the more or less conventional check valve 20 therein is a downwardly extending pipe or arm 22 of the U-tube 24, whose opposite, upwardly extending arm 26 enters through a coupling 28 the substantially larger reading glass tube 30, located within sight of the user of the device,—usually on the dash of the automobile. The upper end of this reading glass tube 30 terminates in a comparatively small discharge port 32 controlled by an immediately adjacent, more or less conventional check-valve 34. The check-valve 34 is so designed and located that, while it is normally open, it will, if there is abnormal pressure in tank 10, be closed by the liquid rising and lifting the valve against the port, and thus prevent the indicating liquid 36 being blown out through port 32 when and if an abnormal pressure is created in the tank 10. Similarly, the check-valve 20 is so designed and located as to normally afford a free passage between tubes 16 and 22, but to close whenever an abnormal suction is created in tank 10 which would, but for this valve, draw the indicating liquid 36 out of the tube 24 into the tank. The abnormal pressure and abnormal suction in tank 10 are always possible because tank 10 is connected by devices not shown in the drawing, more or less directly to the automobile engine which takes the gasoline or other liquid 38 out of the tank for consumption by the engine or other mechanism.

It is well understood in this art that if accurate results are to be obtained in a device of this character, the tube 14 must be kept filled with air and clear of liquid down to the lower end 12 of said tube 14. In order to maintain this condition, the pump 40, preferably but not necessarily of the construction shown in Figure 4, is installed as shown in Fig. 1, in communication with a laterally extending intake port 42 in the side of pipe 22. The construction of the device is such that the operator can by manually manipulating handle 44 on piston rod 46, reciprocate piston 48 to deliver air as required into arm 22 of the U-tube 24.

In detail, the pump 40 of Figure 4 is provided with a conventional form of check-valve 50, normally seated by a spring 52 to prevent the escape of air or liquid from pipe 22. In the pump cylinder and opposite this check-valve is the hollow piston 48, provided with an end port 54 and a side port 56. The piston 48 is rotatable within the cylinder and the device is so constructed that the operator can bring side port 56 of the piston into register with side port 58 in the cylinder to thereby admit air through ports 58 and 56, to the interior of the piston and thence through port 54 into the cylinder. In operation of the pump when the cylinder 48 is drawn back beyond port 58 the air is admitted and the forward stroke compresses it until piston 48 strikes valve stem 55 and opens valve 50, whereupon air passes into line 22. The spring 60 forces piston 48 back far enough to relieve its pressure on valve stem 55 so valve 50 will certainly close. On handle 44 is a mark indicating the position that allows the gauge to be vented. In this position when piston 48 is pressed against valve stem 55, valve 50 is open and the vents 56—58 coincide so that air under pressure in line 22 passes valve 50 through port 54—56—58 thus venting line 22 and causing U gauge to drop to zero indicating an empty tank. The pump handle 44 turned in any position except the special one above indicated acts as a pump and vents 56—58 do not coincide and the pump is again capable of forcing air completely out of tube 14 in tank. This venting of the U gauge is important and is a method of proving that the U gauge is in order and operating correctly. Without a venting device, it would not be known whether the gauge liquid had been changed in some way by evaporation, etc.

Automobile dash boards on which the gauge is usually applied are usually from four to six inches in height and in prior constructions, this has meant that the entire length of the U-tube which does the measuring is limited to these dimensions. When such a small U-tube of the prior art was used, it was found necessary to place in the gauge a liquid about three times as heavy as gasoline in order to get a movement on the U-gauge of one-third the depth of the gasoline tank. These tanks being about ten inches deep, there is a movement in the U-tube of one-third of ten inches or about three inches. The liquid commonly employed for this purpose formerly was bromoform which is costly, evaporates easily and cannot be easily procured. To do away with the requirement for the use of bromoform or other equally expensive liquid, the structure of Figure 1 provides the relatively short reading glass tube 30 of comparatively large diameter on the automobile dash, equipped with graduations 62 to be read by the observer, said tube 30 being in direct communication with the much longer U-device 24, having the pipes 26 and 22 of very much smaller diameter than the diameter of pipe 30.

In actual automobile practice, installation of this structure requires that a U-tube 24 extend substantially below the dash board 64 of the automobile. One way of taking care of this is illustrated in Figure 5 in which the U-tube 24 extends along and is strapped by band 66 to the stationary steering post 68 of the automobile.

The results obtained by this construction are worth while: first, kerosene or other light, non-evaporating, non-freezing oil, which is cheap and readily procurable everywhere, may be used in the U-tube mechanism; second, by properly proportioning the diameters of the tube 30 to the pipes 26 and 22 of the U-mechanism 24, the extensive movement of the kerosene or the like in the U-tube becomes the required three inches or the like movement in reading glass tube 30. By initially varying the diameters of the pipes 30 and 22, the range of movement in the liquid in pipe 30 and consequent length of the scale 62 may be varied to suit the will of the initial constructor.

The structure of Figure 2 differs from that of Figure 1 in the substitution of a large safety chamber 70 for the safety valve mechanism 20, this chamber functioning to receive and retain all the indicating liquid 36 should there be undue suction in tank 10, it being impossible because of the size of this chamber for the suction in comparatively small pipe 14 to draw any of the liquid 36 above and beyond this chamber 70. The structure of Figure 2 further differs from that of Figure 1 in the construction of an enlargement or curve 72 in pipe 22$^a$, at the point occupied by the upper end 74 of liquid 36 at the time there is less than one unit of liquid to be measured in the tank 10,—that is to say, curve 72 is so placed that it will become operative when gasoline or the like between the points 76 and 78 of the tank of Figure 2 is to be measured. The use and positioning of coil 72 arises from the fact that that the most interesting content of a tank is the last gallon, i. e., the bottom gallon in the tank, because it is this gallon which tells how far the automobile user can go before he has to refill his tank. Inserting the coil 72 in pipe 22$^a$ is the same thing as increasing the size of the pipe at that point to, say, the diameter of reading glass tube 30, with the result that as the last gallon is drawn from tank 10, the action of that gallon is magnified along the scale division 80 of tube 30ª of Figure 2, which division is, as shown, of much greater length than the other divisions on the scale of that tube. By varying the character and extent of the curve 72 in tube 22ª, the length of division 80 on the scale of tube 30ª may in the initial construction of the device be increased or diminished within limits to any extent desired.

In Figure 3, a non-rectangular—in the particular case shown, a cylindrical—gasoline tank 10ª is provided and the mechanism of Figures 1 and 2 is modified to make a uniform scale on indicating glass tube 30ᵇ by substituting for pipe 22 a pipe 22ᵇ so shaped in internal capacity that the scale 82 adjacent to glass 30ᵇ will read in uniform divisions. The principle is exactly the same as the installation of the curve 72 in pipe 22ª. By varying the shape of pipe 22ᵇ, the divisions of scale 82 may be thrown off from uniformity as the initial constructor may desire. In the construction of this figure, equalizing air tank 84 is inserted between pump 40 and the right hand arm of the U-tube 24, this tank 84 acting like the ordinary equalizing dome on more or less antiquated fire engines to equalize in the water pressure irregularities in the engine piston movements. In other words, this tank 84 insures a substantially uniform flow of air into the U-tube mechanism as pump 40 is manipulated, instead of a pulsating flow as is the case in the construction of Figure 1.

In order that the mechanism of this invention register accurately in spite of the unlevel roads, the two arms of the U pipe 24, as shown in Figures 6–7, are brought as close together as is practical at the dash. This avoids variation in the two heads of the U liquid for the last gallon in the auto tank, but when the auto tank is full, the gauge liquid heads are separated from each other out of the perpendicular dropped from glass 30 by the distance between that perpendicular and the extreme position 24 of Figure 5. This difference between the two heads of liquid in the U will cause a reading on the glass too great, when the car is going up hill, and too little when going down. I have concluded to neglect this as it is temporary. The above inaccuracy occurring for up and down hill only when the position of the U is bent forward or back of the car's length. The disposition of the U across the car, dropping the arms of same behind the facing of the car with reading glass near said facing, will show no change in head levels in the U for up or down hill, but only be affected by side tilts,—the side tilts of standard roads showing on the gauge only about one tenth inch in error which I am neglecting.

The mechanism heretofore described affords means in which an inexpensive operating liquid, such as kerosene, can be used with great accuracy of results on the scale of gauge tube 30, and with the capability of being constructed so as to make the scale on the tube 30 in any proportion which the designer may think desirable for best results in the operation of the automobile or the like to which the device may be applied.

Obviously, the mechanism may be applied to airships and many other devices besides an automobile, without departing from this invention.

It is specifically pointed out that the air introduced by the pump 40 must be introduced in very small quantities in order not to disturb the reading of the gauge. It is for this reason that the compensating pressure tank of Figure 3 and the other special constructions of the drawings are highly desirable.

One advantage of making the reading glass tube larger than the main U-tube is to render the expansion of the liquid in the U-tube, due to heat, a negligible quantity as it appears in the larger reading glass.

It is desirable to make the tube 22ª of soft metal so that the shape and character of the bend 72 may be varied to thereby adjust the position of the liquid in the U-tube to any predetermined zero point on the reading glass.

Having thus described my invention, what I claim as new and desire to secure by Letters Patent is:

1. In combination with a tank for containing a liquid, a U-tube, a tube connecting said U-tube with said tank at the minimum depth within the latter at which the level of liquids therein is to be measured, an indicating element in said U-tube being movable by variations in the level of the liquid in said tank, an indicator associated with said U-tube, adapted to register the movements of said indicating element, and means included solely within said U-tube and spaced from said indicator, whereby the movement of said indicating element proportionate to the variations of the level of the liquid in the tank is increased as the liquid becomes exhausted from the tank.

2. In combination with a tank for containing a liquid, an indicator glass of uniform diameter throughout, an indicating liquid in said glass, a U-tube, one end thereof being connected to said indicator glass, means connecting the other end of said tube with said tank at the minimum depth within the latter at which the level of liquids therein is to be measured, whereby variations in the level of the liquid in the tank will move the indicating liquid in said indicator glass, and means for increasing the capacity of said U- tube between two predetermined spaced points in its length located opposite said indicator glass over its capacity between any other two similarily spaced points in its length, whereby the movement of said indicating liquid proportionate to the variations of the level of the liquid in said tank is increased as the liquid becomes substantially exhausted from the tank.

3. In combination with a tank for containing a liquid, means for indicating the level of liquid in the tank comprising a U-tube, a connection from one arm of the U-tube to said tank at the minimum depth within the latter at which the liquid is to be indicated, an indicator section secured to the other arm of the U-tube, and an indicating liquid within the U-tube, one of the arms of said U-tube at a point spaced from the indicator section being configurated so as to cause the relative proportional movement of said indicating liquid with respect to the movement of the level of the liquid in the tank to be increased as the tank empties.

In witness whereof, I have hereunto subscribed my name.

JAMES FENTRESS.